(12) United States Patent
Kato

(10) Patent No.: US 11,890,981 B2
(45) Date of Patent: Feb. 6, 2024

(54) VEHICLE STEP DEVICE

(71) Applicant: AISIN CORPORATION, Aichi (JP)

(72) Inventor: Tomoyuki Kato, Kariya (JP)

(73) Assignee: AISIN CORPORATION, Kariya (JP)

( * ) Notice: Subject to any disclaimer, the term of this patent is extended or adjusted under 35 U.S.C. 154(b) by 263 days.

(21) Appl. No.: 17/203,831

(22) Filed: Mar. 17, 2021

(65) Prior Publication Data
US 2021/0323458 A1    Oct. 21, 2021

(30) Foreign Application Priority Data

Apr. 20, 2020    (JP) ................. 2020-074625

(51) Int. Cl.
*B60P 1/43*          (2006.01)
*B60P 1/44*          (2006.01)

(52) U.S. Cl.
CPC ............. *B60P 1/431* (2013.01); *B60P 1/4485* (2013.01); *B60P 1/4492* (2013.01); *B60P 1/436* (2013.01)

(58) Field of Classification Search
CPC ....... B60P 1/431; B60P 1/4485; B60P 1/4492; B60P 1/436; B60P 1/433; B60R 3/02; A61G 3/02; A61G 3/06
See application file for complete search history.

(56) References Cited

U.S. PATENT DOCUMENTS

| 2,348,306 | A | * | 5/1944 | Parsons | ................... | E05F 15/47 296/117 |
| 4,025,104 | A | * | 5/1977 | Grossbach | .......... | E05D 15/1081 49/218 |
| 5,380,144 | A | * | 1/1995 | Smith | .................... | A61G 3/061 14/71.3 |
| 5,867,870 | A | * | 2/1999 | Kluting | ................. | E05D 7/1022 16/257 |
| 6,183,039 | B1 | * | 2/2001 | Kohut | ................. | E05D 15/1081 296/146.12 |

(Continued)

FOREIGN PATENT DOCUMENTS

| DE | 102019209938 A1 * | 1/2021 |
| JP | 7-37808 U | 7/1995 |

(Continued)

*Primary Examiner* — Amy R Weisberg
*Assistant Examiner* — Sara Laghlam
(74) *Attorney, Agent, or Firm* — Oblon, McClelland, Maier & Neustadt, L.L.P.

(57) ABSTRACT

A vehicle step device includes: a movable step that is provided in a door opening of a vehicle; and a drive controller that drives the movable step so that the movable step operates in deployment and storage directions. The drive controller includes a sidewalk detection unit that detects a sidewalk provided in parallel with a traveling road surface of the vehicle, a separation distance detecting unit that detects a separation distance between a side edge portion of the vehicle in which the movable step is stored and the sidewalk, and a deployment amount setting unit that sets a deployment amount of the movable step extending in a width direction of the traveling road surface from the side edge portion of the vehicle based on the separation distance. The deployment amount setting unit sets a deployment amount of the movable step to be larger as the separation distance increases.

6 Claims, 10 Drawing Sheets

(56) References Cited

U.S. PATENT DOCUMENTS

| | | | | |
|---|---|---|---|---|
| 6,447,054 | B1 * | 9/2002 | Pietryga | E05D 3/147 |
| | | | | 296/146.12 |
| 9,650,826 | B2 * | 5/2017 | Potter | E05F 15/616 |
| 10,190,344 | B2 * | 1/2019 | Reddmann | E05C 17/003 |
| 11,541,942 | B2 * | 1/2023 | Ohtake | B62D 47/00 |
| 2008/0238019 | A1 * | 10/2008 | Okada | B61D 23/025 |
| | | | | 280/166 |
| 2014/0144261 | A1 * | 5/2014 | Sasaki | E05F 15/611 |
| | | | | 74/89 |
| 2015/0021931 | A1 * | 1/2015 | Konchan | E05B 77/48 |
| | | | | 49/506 |
| 2019/0193620 | A1 * | 6/2019 | Matsuoka | B60K 7/0007 |
| 2020/0155385 | A1 * | 5/2020 | Darnaud | B60P 1/435 |
| 2021/0245650 | A1 * | 8/2021 | Tomioka | E05F 15/76 |
| 2022/0371498 | A1 * | 11/2022 | Sato | B60P 1/431 |
| 2023/0101291 | A1 * | 3/2023 | Dosenbach | E05D 3/06 |
| | | | | 49/70 |
| 2023/0124710 | A1 * | 4/2023 | Smith | A61G 3/061 |
| | | | | 414/507 |

FOREIGN PATENT DOCUMENTS

| | | | |
|---|---|---|---|
| JP | 8-91128 A | | 4/1996 |
| JP | 2008-238978 A | | 10/2008 |
| JP | 2022060639 A | * | 4/2022 |
| JP | 2022160122 A | * | 10/2022 |

* cited by examiner

STORAGE STATE

DEPLOYMENT STATE

MIDDLE OF EXTENSION (STEP MODE)

FULL EXTENSION & LIFT UP (SLOPE MODE) L>Lm

VEHICLE STEP DEVICE

CROSS REFERENCE TO RELATED APPLICATIONS

This application is based on and claims priority under 35 U.S.C. § 119 to Japanese Patent Application 2020-074625, filed on Apr. 20, 2020, the entire content of which is incorporated herein by reference.

TECHNICAL FIELD

This disclosure relates to a vehicle step device.

BACKGROUND DISCUSSION

In the related art, for example, JP 2008-238978 (Reference 1) discloses a vehicle step device including a movable step that is provided in a door opening of a vehicle and a drive controller that drives the movable step so that the movable step operates in deployment and storage directions. By adopting this step device, it is possible to freely set a deployment amount of the movable step protruding from a side edge portion of the vehicle in a width direction of a traveling road surface. Then, an operation timing can also be freely set.

However, for example, when an occupant gets on or off a vehicle stopped at a stop, a positional relationship between a getting on/off position and the vehicle is not always constant, and is changed depending on the shape of a traveling road surface and sidewalk or a stop position of the vehicle. Therefore, since it is not always enough to only provide the step device described in the relate art, there is still room for improvement in this respect.

A need thus exists for a vehicle step device which is not susceptible to the drawback mentioned above.

SUMMARY

A vehicle step device according to an aspect of this disclosure includes: a movable step that is provided in a door opening of a vehicle; and a drive controller that drives the movable step so that the movable step operates in deployment and storage directions, in which the drive controller includes a sidewalk detection unit that detects a sidewalk provided in parallel with a traveling road surface of the vehicle, a separation distance detecting unit that detects a separation distance between a side edge portion of the vehicle in which the movable step is stored and the sidewalk, and a deployment amount setting unit that sets a deployment amount of the movable step extending in a width direction of the traveling road surface from the side edge portion of the vehicle based on the separation distance, and the deployment amount setting unit sets a deployment amount of the movable step to be larger as the separation distance increases.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a vehicle step device will be described with reference to the drawings.

Figure 1:
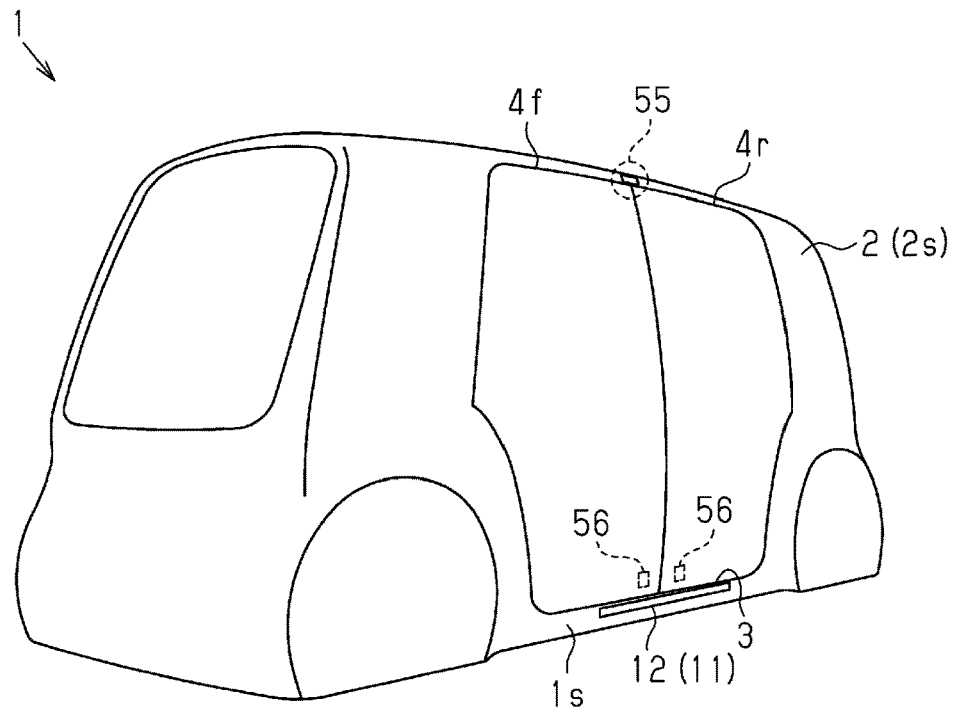
FIG. 1 is a perspective view of a vehicle including a slope device that functions as a step device.
Figure 2:
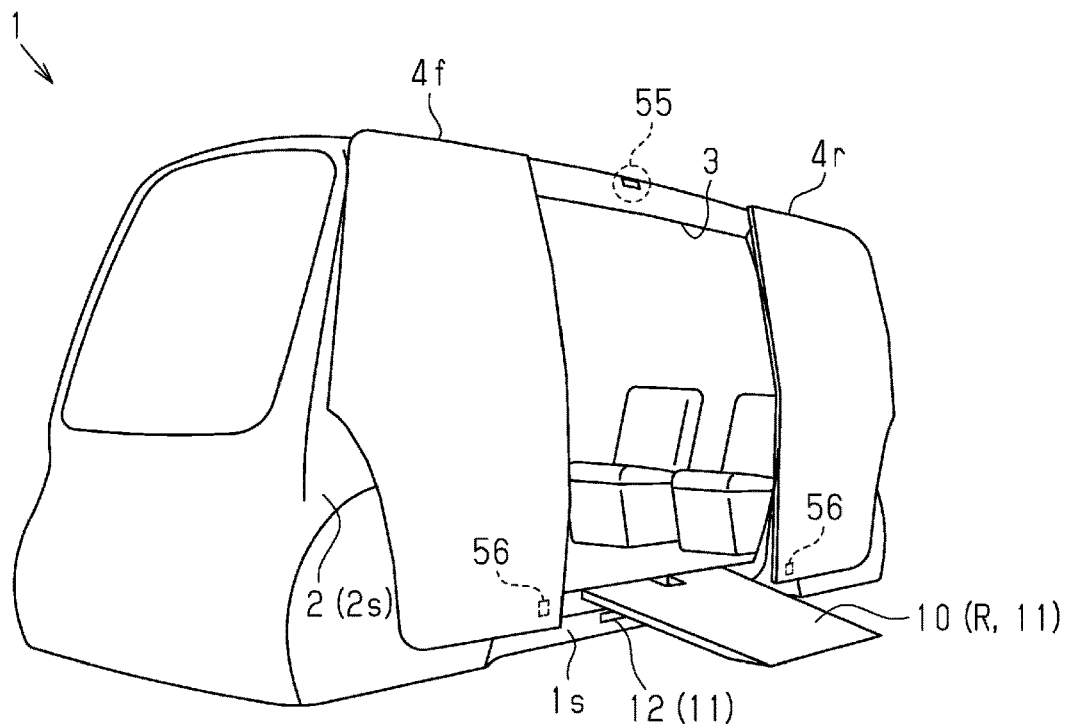
FIG. 2 is a perspective view of the vehicle including the slope device that functions as the step device.

As illustrated in FIGS. 1 and 2, a vehicle 1 of the present embodiment has a square substantially box-shaped vehicle body 2 extending in a front-rear direction of the vehicle. Further, a door opening 3 serving as a boarding gate for an occupant is provided on a side surface 2s of the vehicle body 2. The door opening 3 includes a pair of slide doors 4f and 4r that is opened and closed in the front-rear direction of the vehicle and in directions opposite to each other.

That is, the slide door 4f on a vehicle front side moves to the vehicle front side so as to be opened and moves a vehicle rear side so as to be closed. Meanwhile, the slide door 4r on the vehicle rear side moves to the vehicle rear side so as to be opened and moves to the vehicle front side so as to be closed. Further, each of the slide doors 4f and 4r has a configuration as a power slide door device that is opened or closed based on a driving force of an actuator (not illustrated). The vehicle 1 of the present embodiment is configured to open and close the door opening 3 in such a way that the slide doors 4f and 4r are interlocked with each other.

The vehicle 1 of the present embodiment includes a slope device 11 that deploys a slope plate 10 at a lower end of the door opening 3 when the door opening 3 is in a fully open state. Then, the vehicle 1 of the present embodiment uses a ramp R formed by the slope plate 10. Accordingly, an occupant, for example, a user of a wheelchair, a carrier with wheels, a bicycle, or the like can easily get on and off from the door opening 3.

Figure 3:
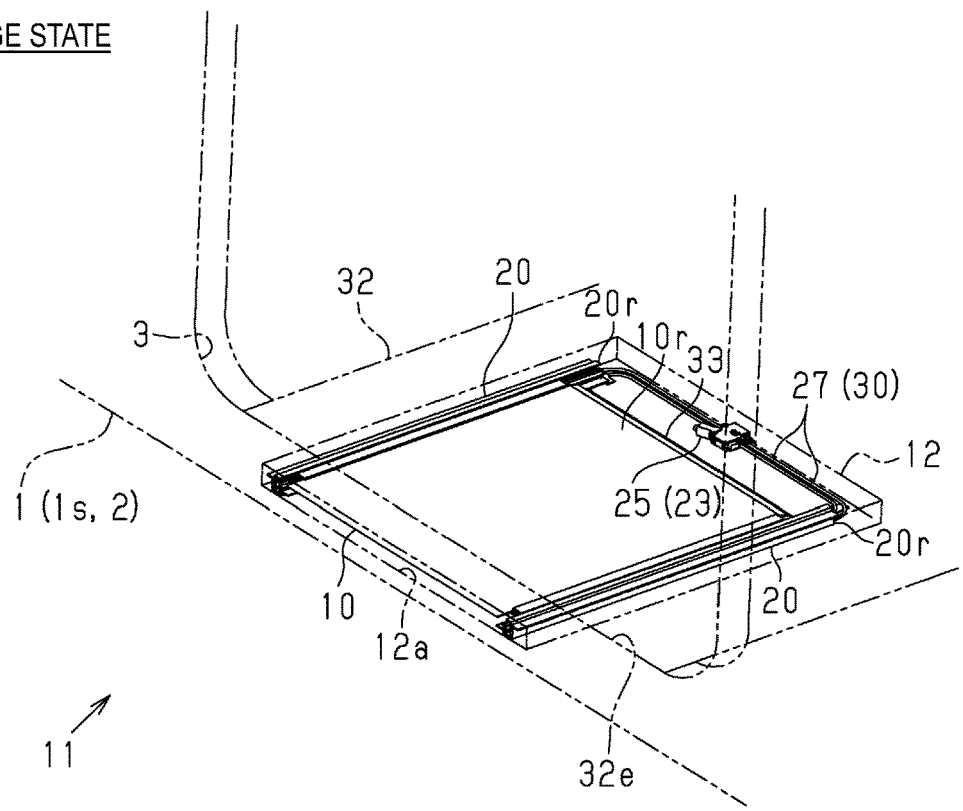
FIG. 3 is a perspective view of the slope device provided below a door opening.
Figure 4:
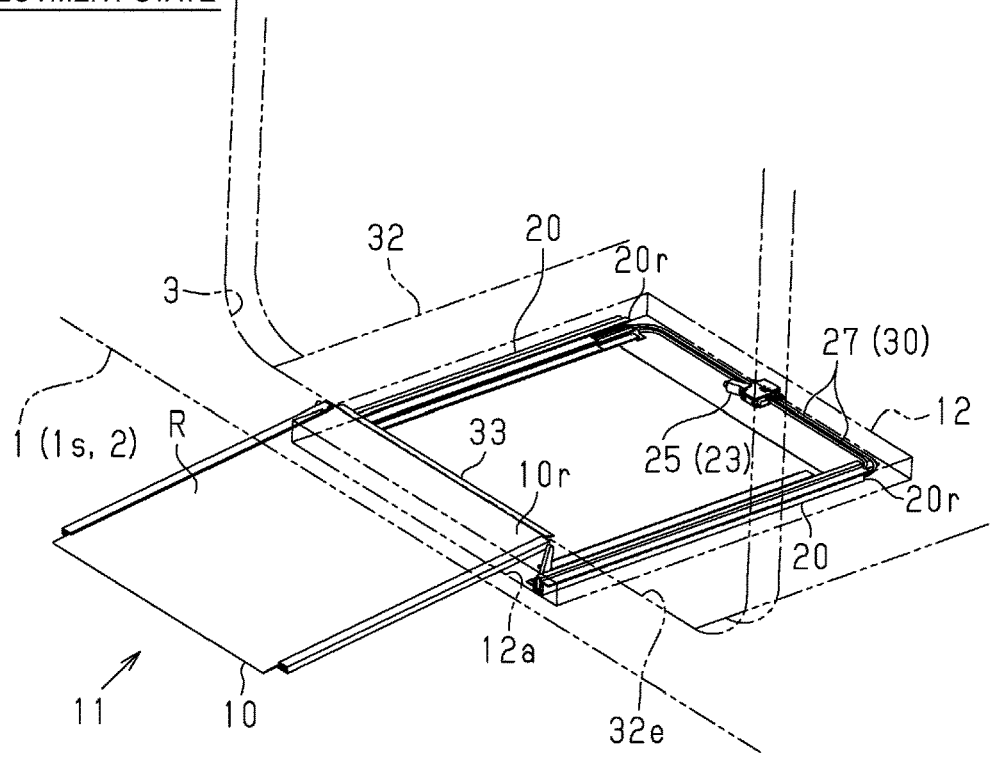
FIG. 4 is a perspective view of the slope device provided below the door opening.

As illustrated in FIGS. 3 and 4, in the vehicle 1 of the present embodiment, the slope device 11 is installed in a storage box 12 provided below the door opening 3. Specifically, the storage box 12 has an opening 12a in the same direction as that of the door opening 3. Then, the slope device 11 of the present embodiment is configured to deploy the slope plate 10 stored in the storage box 12 to an outside of the vehicle through the opening 12a, and store the deployed slope plate 10 in the storage box 12 again.

More specifically, the slope device 11 of the present embodiment includes a pair of guide rails 20 and 20 that extends in deployment and storage directions of the slope plate 10 deployed from the storage box 12 to the lower end of the door opening 3, that is, a depth direction in the storage box 12.

Figure 5:
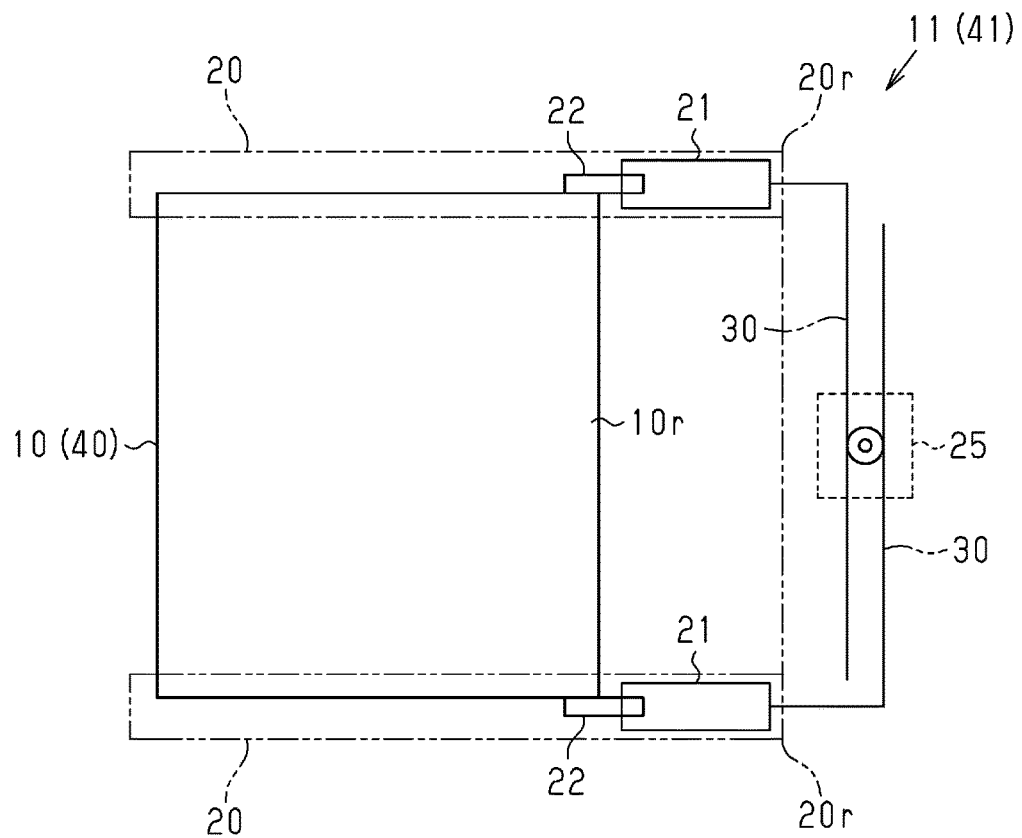
FIG. 5 is a schematic configuration view of the slope device.

As illustrated in FIGS. 3 to 5, in the slope device 11 of the present embodiment, the guide rails 20 and 20 are substantially parallel to each other in an aspect where the slope plate 10 in the storage box 12 is interposed from both sides in a width direction. The slope device 11 of the present embodiment includes moving bodies 21 and 21 that are slidably provided along extension directions of the respective engaged guide rails 20 and 20 in a state where each guide rail 20 is engaged. Further, the slope device 11 includes a pair of support arms 22 and 22 that is interposed between the respective moving bodies 21 and 21 and the slope plate 10 in a state of being rotatable with respect to the respective moving bodies 21 and 21 and rotatable with respect to a rear end portion 10r of the slope plate 10. Accordingly, the slope device 11 of the present embodiment is configured such that the slope plate 10 moves in the deployment and storage directions together with the respective moving bodies 21 and 21 and the respective support arms 22 and 22.

The slope device 11 of the present embodiment includes an actuator 25 of which a drive source is a motor 23. In the slope device 11 of the present embodiment, the actuator 25 is disposed in the storage box 12 behind rear end portions 20r of the respective guide rails 20 and 20. The slope device 11 of the present embodiment includes casing pipes 27 and 27 which connect the actuator 25 and the rear end portions 20r of the guide rails 20 and 20 to each other, and a pair of drive cables 30 and 30 that is routed along extension directions of the respective casing pipes 27 and 27 and the guide rails 20 and 20. Then, in the slope device 11 of the present embodiment, the respective moving bodies 21 and 21 move along the extension directions of the respective guide rails 20 and 20 based on the driving force of the actuator 25 transmitted via the respective drive cables 30 and 30.

Figure 6:
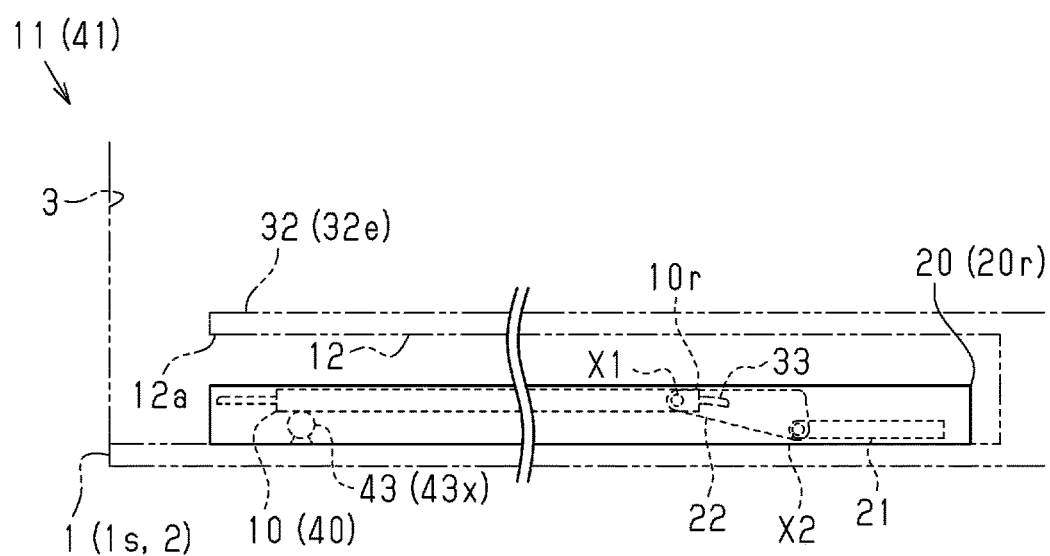
FIG. 6 is an operation explanatory view of the slope device that functions as the step device.
Figure 7A:
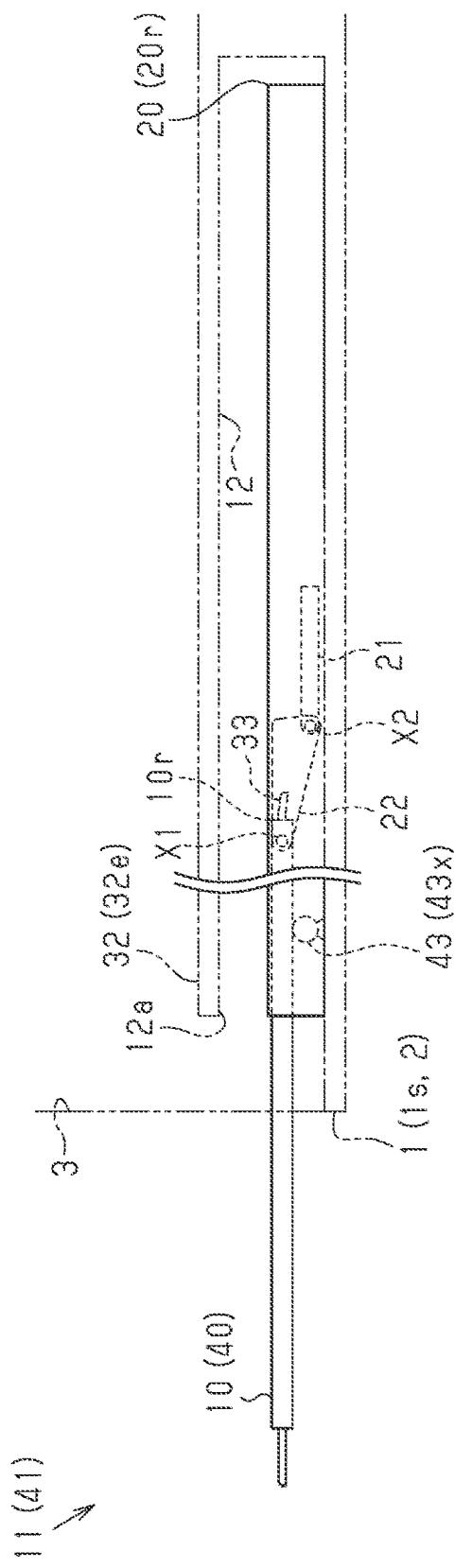
FIGS. 7A and 7B are operation explanatory views of the slope device that functions as the step device.

More specifically, as illustrated in FIGS. 6 and 7A, in the slope device 11 of the present embodiment, the slope plate 10 is accommodated in the storage box 12 in a state where a substantially horizontal posture is held based on an engaging force of the moving body 21 and the support arm 22 with respect to the guide rail 20. Then, in the slope device 11 of the present embodiment, the slope plate 10 is configured to move in the deployment and storage directions integrally with the moving body 21 and the support arm 22 along the extension direction of the guide rail 20 while holding the substantially horizontal posture.

Figure 7B:
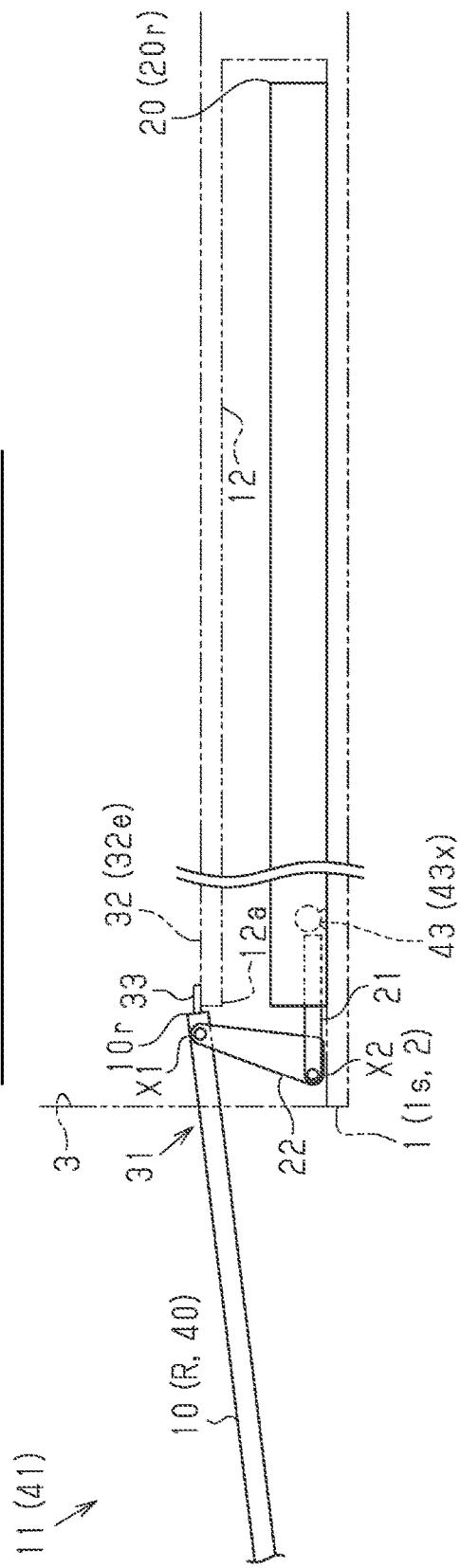

As illustrated in FIG. 7B, in the slope device 11 of the present embodiment, in the slope plate 10 that is deployed to the outside of the vehicle in an aspect of extending to an outside in a vehicle width direction from the side edge portion 1s of the vehicle 1 provided with the storage box 12, the moving body 21 and the support arm 22 move in the deployment direction beyond a position where the extension of the slope plate 10 is completed. Therefore, in the slope device 11 of the present embodiment, the moving body 21 and the support arm 22 function as a lift mechanism 31 that lifts the rear end portion 10r of the slope plate 10 upward based on an engagement relationship with respect to the guide rail 20. Specifically, the support arm 22 rotates around a connection point X1 with respect to the rear end portion 10r of the slope plate 10 and a connection point X2 with respect to the moving body 21, and thus the rear end portion 10r of the slope plate 10 is lifted. The slope device 11 of the present embodiment is configured so that the slope plate 10 forms the ramp R in an aspect in which the rear end portion 10r is brought closer to a vehicle floor 32.

In the slope device 11 of the present embodiment, a floor engaging portion 33 is provided in the rear end portion 10r of the slope plate 10. Then, in the slope device 11 of the present embodiment, the floor engaging portion 33 engages with an edge portion 32e of the vehicle floor 32, and thus the vehicle floor 32 supports a load of the slope plate 10.

Figure 8:
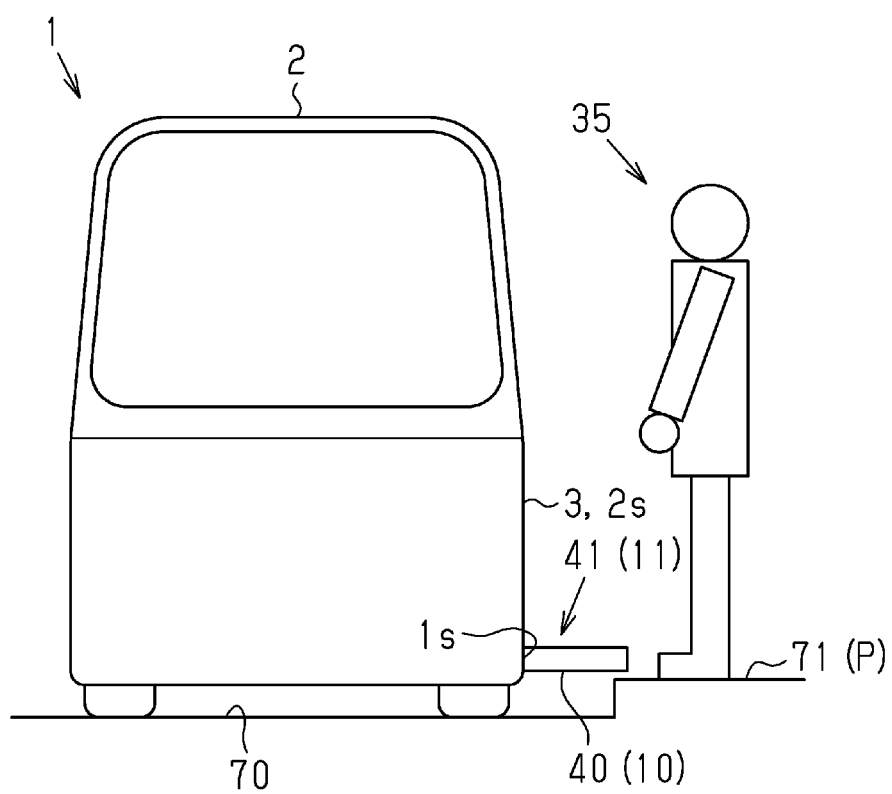
FIG. 8 is an operation explanatory view of the slope device that functions as the step device.

As illustrated in FIGS. 7A and 8, in the slope device 11 of the present embodiment, as described above, when the slope plate 10 is deployed, a deployment operation of the slope plate 10 can be stopped before the extension of the slope plate 10 to the outside in the vehicle width direction is completed. Further, in this state, the slope device 11 of the present embodiment can support a load of an occupant 35 who puts his/her foot on the slope plate 10, that is, the load of the occupant 35 who gets on and off the vehicle 1 through the door opening 3. Accordingly, the slope device 11 of the present embodiment is configured to function as a step device 41 for deploying and storing a movable step 40 by using the slope plate 10 as the movable step 40.

The slope device 11 of the present embodiment includes a load support device 43 that supports the slope plate 10 in a middle of the extension in the vicinity of the opening 12a of the storage box 12. Specifically, the load support device 43 has a rotation member 43x that is in sliding contact with the slope plate 10, which moves in the deployment and storage directions, from below. Therefore, in the slope device 11 of the present embodiment, it is possible to stably support the load of the occupant 35 using the slope plate 10 in the movable step 40 while ensuring smooth deployment and storage operations of the slope plate 10.

Figure 9:
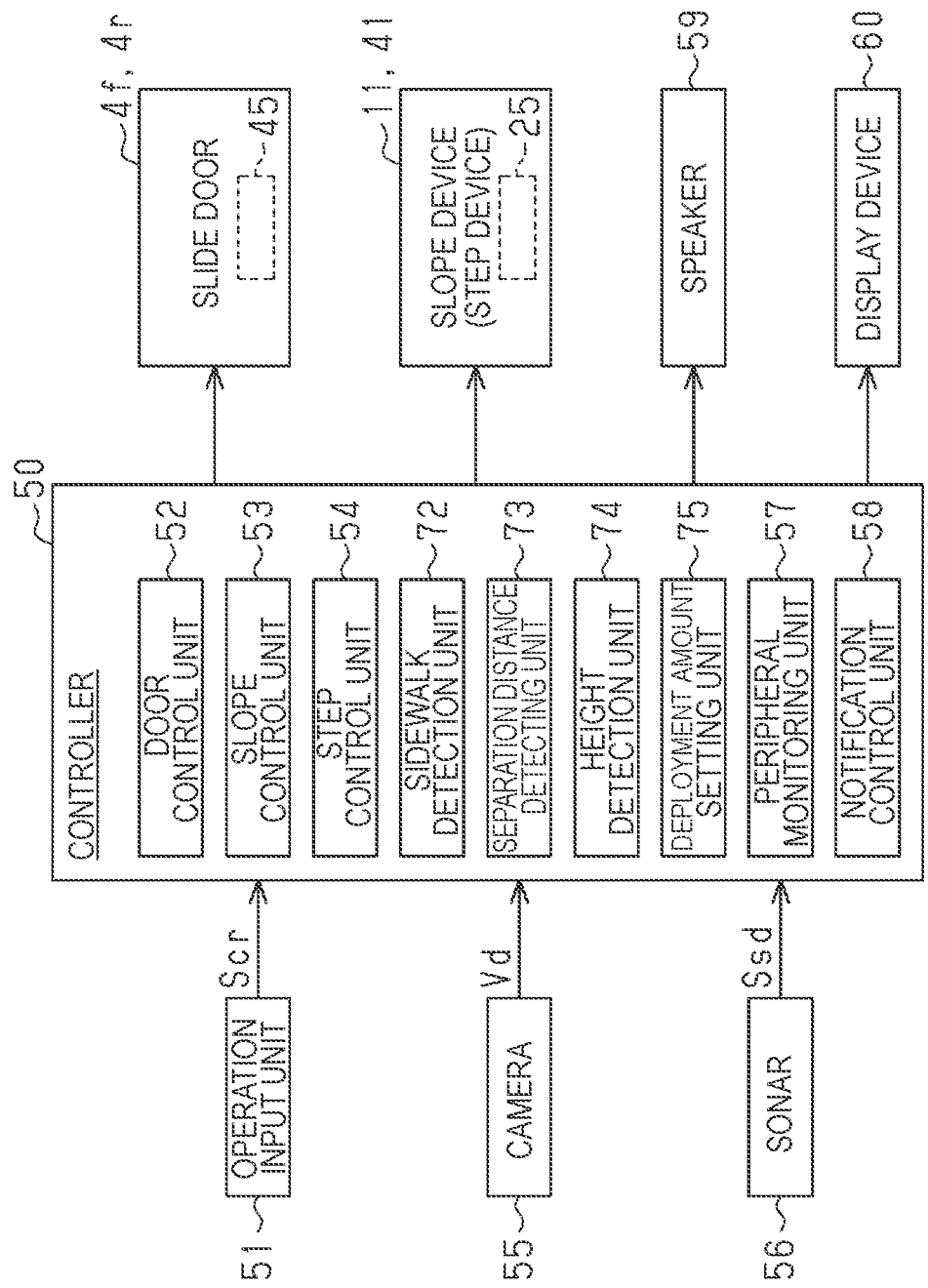
FIG. 9 is a control block diagram of the slope device that functions as the step device.

Further, as illustrated in FIG. 9, in the vehicle 1 of the present embodiment, operations of the actuator 25 of the slope device 11 and an actuator 45 of the slide doors 4f and 4r having a configuration as a power slide door device are controlled by a controller 50.

Specifically, for example, in the controller 50 of the present embodiment, an operation input signal Scr is input to an operation input unit 51 provided in the vehicle 1 such as a driver's seat (not illustrated). That is, in the vehicle 1 of the present embodiment, operation requests of the slide doors 4f and 4r and an operation request of the slope device 11 by the driver of the vehicle 1 are input to the controller 50 as the operation input signal Scr. The controller 50 of the present embodiment includes a door control unit 52 that controls opening/closing operations of the slide doors 4f and 4r, and a slope control unit 53 that controls the deployment and storage operations of the slope device 11 based on the operation requests.

In the vehicle 1 of the present embodiment, based on the operation input to the operation input unit 51, it is possible to select a slope mode in which the slope plate 10 deployed in a manner extending to the outside in the vehicle width direction from the side edge portion 1s of the vehicle 1 forms the ramp R and a step mode in which the slope plate 10 is used for the movable step 40. The controller 50 of the present embodiment includes a step control unit 54 which operates the slope device 11 as the step device 41 when the step mode is selected.

Figure 10:
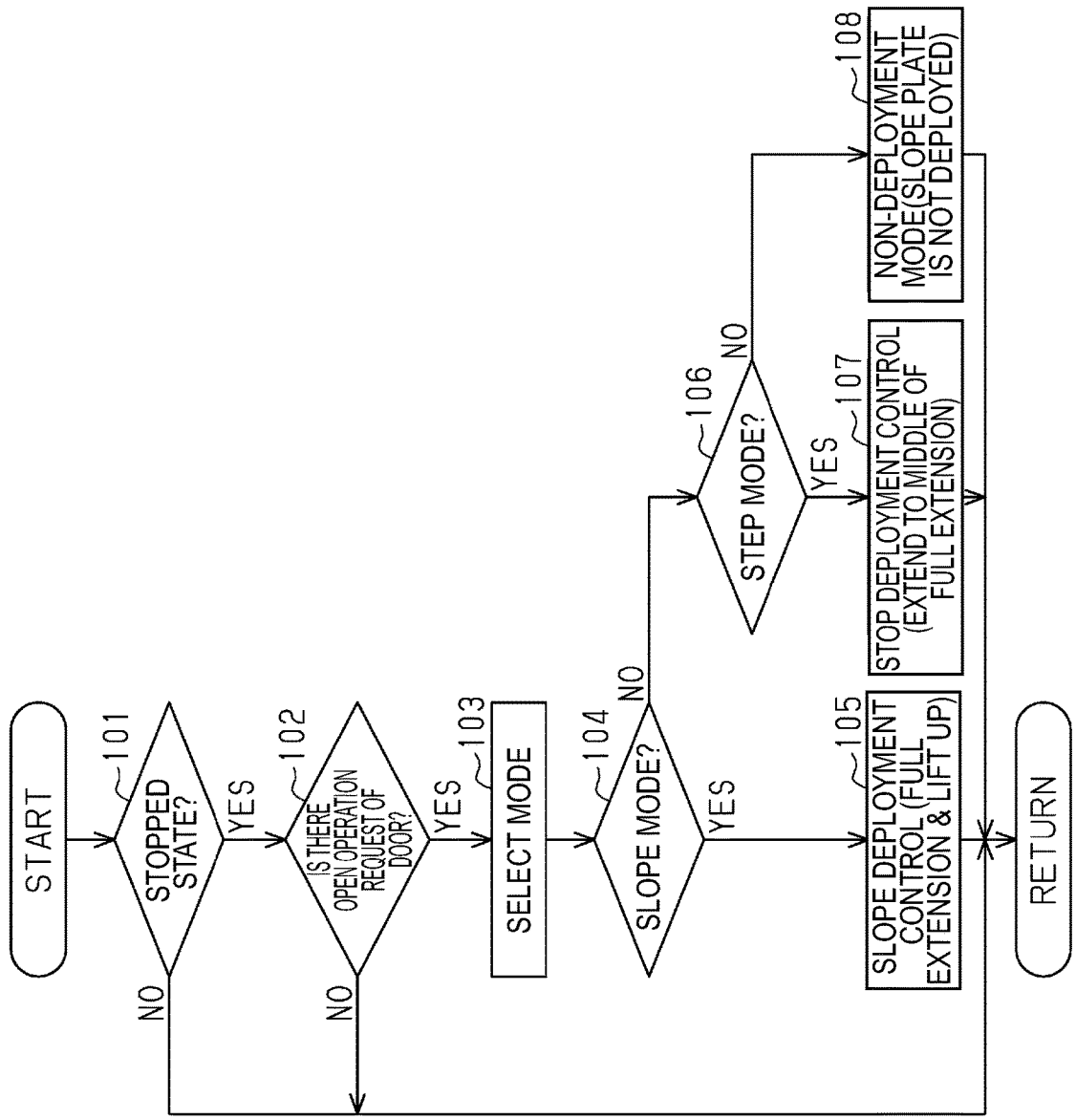
FIG. 10 is a flowchart illustrating a processing procedure for a deployment control of the slope device that functions as the step device.

More specifically, as illustrated in a flowchart of FIG. 10, the controller 50 of the present embodiment receives open operation requests of the slide doors 4f and 4r (Step 102:

YES) when the vehicle 1 is in a stopped state (Step 101: YES). In the vehicle 1 of the present embodiment, a mode selection operation of the slope device 11 is performed together with the open operation requests of the slide doors 4f and 4r (Step 103). Then, when the operation input signal Scr indicating that the slope mode is selected is detected (Step 104: YES), the controller 50 of the present embodiment controls the operation of the slope device 11 so as to form the ramp R on the slope plate 10 deployed below the door opening 3 (slope deployment control, Step 105).

That is, in this case, the controller 50 of the present embodiment fully extends the slope plate 10 until the rear end portion 10r of the slope plate 10 is disposed outside of the vehicle, as the slope deployment control. Then, by lifting up the rear end portion 10r, the slope plate 10 is controlled to form the ramp R.

Further, when the step mode is selected in the Step 103 (Step 104: NO and Step 106: YES), the controller 50 of the present embodiment controls the operation of the slope device 11 so that the slope plate 10 deployed below the door opening 3 is used as the movable step 40 of the step device 41 (step deployment control, Step 107). Then, in this case, as the step deployment control, the controller 50 extends the slope plate 10 to a position at which the occupant 35 who gets on and off the vehicle 1 through the door opening 3 can easily put his/her foot on, that is, to a middle of the full extension while maintaining the slope plate 10 used for the movable step 40 in a substantially horizontal posture.

Further, in the vehicle 1 of the present embodiment, neither the slope mode nor the step mode can be selected in the Step 103 (Step 104: NO and Step 106: NO). In this case, the controller 50 of the present embodiment is configured so that a non-deployment mode is selected (Step 108) and the slope plate 10 is not deployed.

Figure 11:
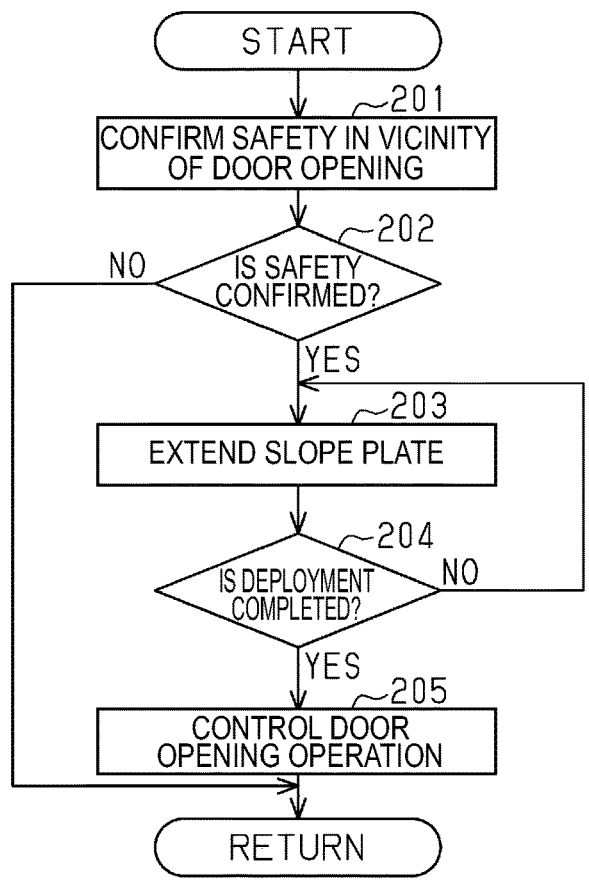
FIG. 11 is a flowchart illustrating a processing procedure for deploying a slope plate that can be used as a movable step and opening a slide door.

Further, as illustrated in the flowchart of FIG. 11, when the controller 50 of the present embodiment deploys the slope plate 10 below the door opening 3 by executing Step 105 or Step 107, the controller 50 monitors the vicinity of the vehicle 1 to execute a safety confirmation in the vicinity of the door opening 3 (Step 201). Further, the controller 50 extends the slope plate 10 from the side edge portion 1s of the vehicle 1 to the outside in the vehicle width direction (Step S203) in a state where the safety in the vicinity of the door opening 3 is confirmed (Step 202: YES). Therefore, the controller 50 of the present embodiment is configured to execute the opening operation controls of the slide doors 4f and 4r (Step S205) in a state where the deployment of the slope plate 10 is completed (Step 204: YES).

That is, in the vehicle 1 of the present embodiment, when the slope mode is selected (refer to FIG. 10, Step 104: YES), opening operations of the slide doors 4f and 4r are started in a state where the slope plate 10 extending from the side edge portion 1s of the vehicle 1 forms the ramp R below the door opening 3. Then, when the step mode is selected (refer to FIG. 10, Step 106: YES), similarly, the opening operations of the slide doors 4f and 4r are started in a state where the slope plate 10 is deployed at the extension position as the movable step 40.

Further, when the controller 50 of the present embodiment stores the slope plate 10 deployed below the door opening 3 by executing the slope mode and the step mode in the storage box 12, after closing operations of the slide doors 4f and 4r are completed, a storage operation of the slope plate 10 starts. Accordingly, in the vehicle 1 of the present embodiment, it is possible to ensure the safety of the occupant 35 who uses the ramp R formed by the slope plate 10 and the slope plate 10 for the movable step 40 of the step device 41 to get on and off the vehicle 1.

In more detail, as illustrated in FIG. 9, a captured image Vd outside of the vehicle photographed by a camera 55 provided in the vehicle 1 and an output signal Ssd of a sonar 56 also provided in the vehicle 1 are input to the controller 50 of the present embodiment. In the vehicle 1 of the present embodiment, for example, the camera 55 is provided above the door opening 3 (refer to FIGS. 1 and 2). For example, the sonars 56 are provided in lower end portions of the slide doors 4f and 4r. The controller 50 of the present embodiment includes a peripheral monitoring unit 57 that monitors a periphery of the vehicle 1 by analyzing the captured image Vd of the camera 55 and the output signal Ssd of the sonar 56. Accordingly, the controller 50 of the present embodiment is configured to execute the safety confirmation in the vicinity of the door opening 3 at the time of operation controls of the slide doors 4f and 4r and at the time of an operation control of the slope device 11 (refer to FIG. 11, Step 201).

Specifically, when the slide doors 4f and 4r are opened or closed, the controller 50 of the present embodiment determines whether or not there is an obstacle on an opening/closing locus. Similarly, when the operation of the slope device 11 is controlled, the controller 50 determines whether or not there is an obstacle on the deployment and storage locus of the slope plate 10. The controller 50 of the present embodiment includes a notification control unit 58 that executes, when the obstacle detected in the vicinity of the door opening 3 is a person, a notification output for urging the person to evacuate. In the vehicle 1 of the present embodiment, the notification output in this case is performed by combining an output of a voice guidance or a warning sound using a speaker 59 provided in the vehicle 1 and a visual warning output using a display device 60 such as a display or a warning light. Accordingly, in the vehicle 1 of the present embodiment, the operation controls of the slide doors 4f and 4r and the slope device 11 are executed in a state where the safety in the vicinity of the door opening 3 is confirmed.

The controller 50 of the present embodiment sets a time limit in advance and executes the safety confirmation in the vicinity of the door opening 3. Then, when the safety in the vicinity of the door opening 3 is not confirmed within the set time limit, that is, when the time is over, the deployment and storage controls of the slope device 11 and the opening/closing controls of the slide doors 4f and 4r are not executed, and the state is shifted to a standby state for receiving the operation request again.

As illustrated in FIGS. 8 and 9, the controller 50 of the present embodiment includes a sidewalk detection unit 72 that detects a sidewalk 71 provided in parallel to a traveling road surface 70 of the vehicle 1 by analyzing the captured image Vd of the camera 55 and the output signal Ssd of the sonar 56. Accordingly, the controller 50 of the present embodiments specifies a positional relationship between the sidewalk 71 which is a getting on/off position P of the occupant 35 who gets on/off the vehicle 1 through the door opening 3 and the movable step 40 deployed in an aspect of extending in a width direction of the traveling road surface 70 from the side edge portion 1s of the vehicle 1. Then, the controller 50 of the present embodiment executes the step deployment control in which the slope plate 10 of the slope device 11 is used for the movable step 40 of the step device 41, based on the specified positional relationship between the movable step 40 and the sidewalk 71 (refer to FIG. 10, Step 107).

(Step Deployment Control)

Next, an aspect of the step deployment control executed by the controller 50 of the present embodiment will be described. In the following description of the step deployment control, for convenience, the slope device 11 that operates as the step device 41 is simply referred to as the step device 41, and the slope plate 10 used as the movable step 40 thereof is simply referred to as the movable step 40.

Figure 12:
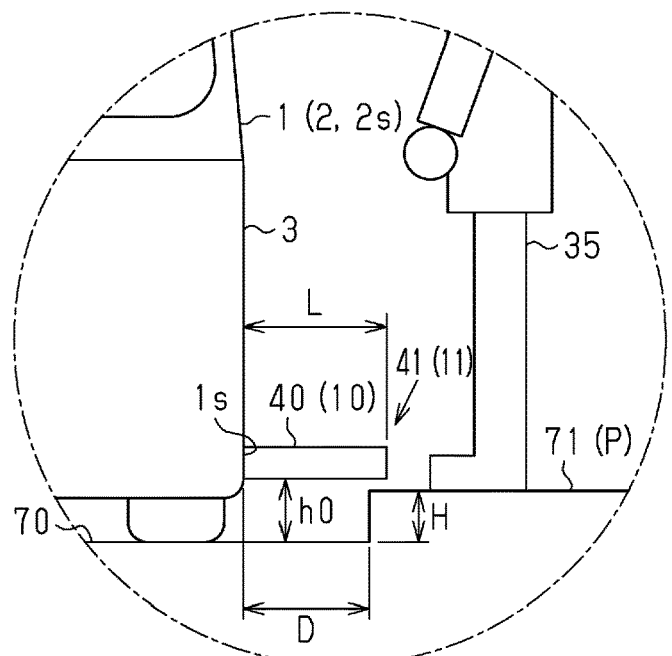
FIG. 12 is an explanatory diagram illustrating an aspect of a step deployment control.

As illustrated in FIGS. 9 and 12, the controller 50 of the present embodiment includes a separation distance detecting unit 73 that detects a separation distance D between the side edge portion 1s of the vehicle 1 in which the movable step 40 is stored and the detected sidewalk 71. The controller 50 includes a height detection unit 74 that detects a height H of the sidewalk 71 with respect to the traveling road surface 70 of the vehicle 1. The controller 50 of the present embodiment includes a deployment amount setting unit 75 that sets a deployment amount L of the movable step 40 extending in the width direction of the traveling road surface 70 from the side edge portion 1s of the vehicle 1 in which the storage box 12 is provided, based on the separation distance D between the side edge portion 1s of the vehicle 1 and the sidewalk 71 and the height H of the sidewalk 71 detected thereby.

Figure 13:
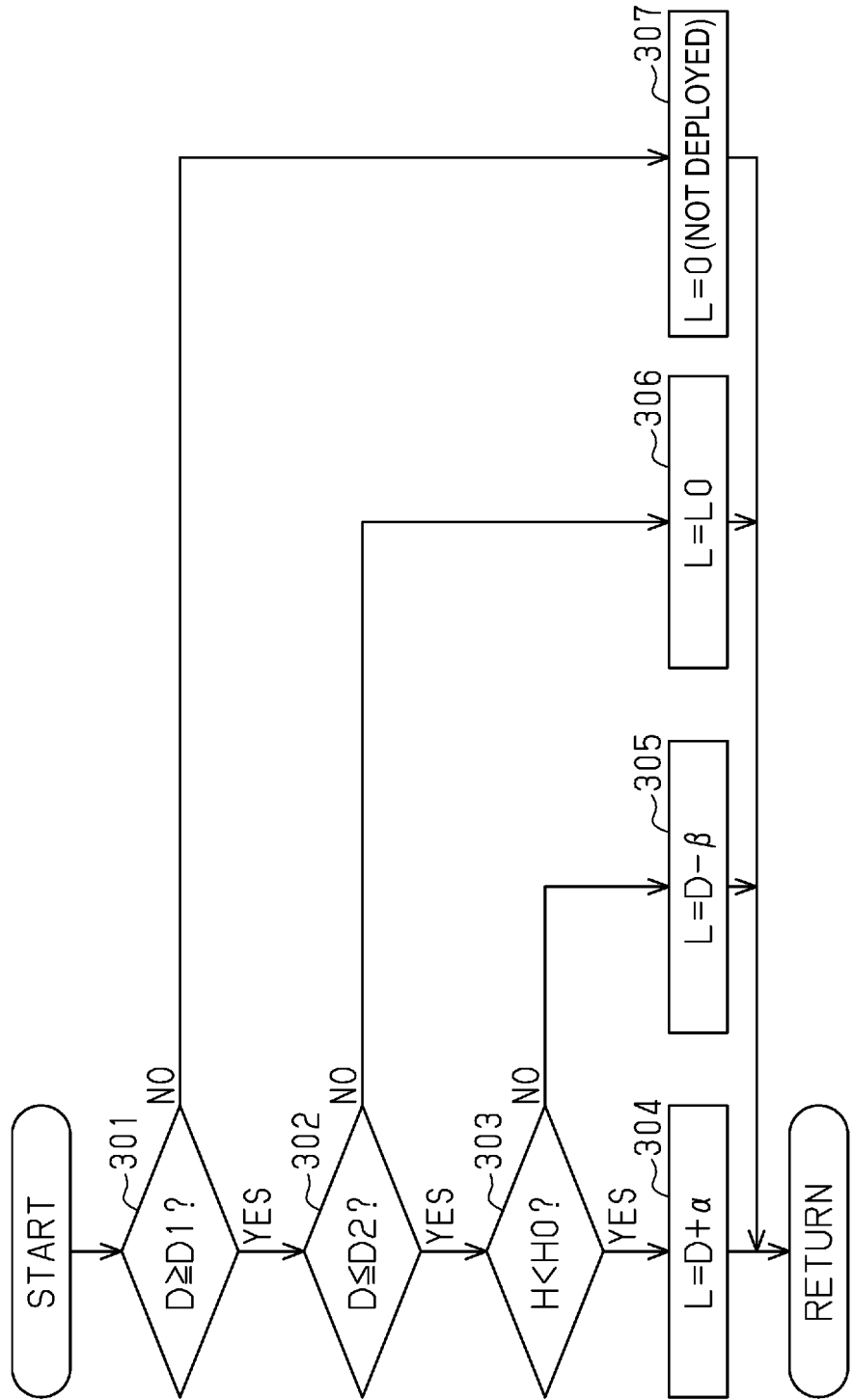
FIG. 13 is a flowchart illustrating a processing procedure for setting a deployment amount of a movable step.

More specifically, as illustrated in the flowchart of FIG. 13, first, the deployment amount setting unit 75 of the present embodiment compares the separation distance D between the side edge portion 1s of the vehicle 1 and the sidewalk 71 with a predetermined minimum deployment distance D1 (Step 301). When the deployment amount setting unit 75 determines that the separation distance D from the sidewalk 71 is equal to or more than the minimum deployment distance D1 (D≥D1, Step 301: YES), the deployment amount setting unit 75 subsequently compares the separation distance D from the sidewalk 71 with a predetermined maximum deployment distance D2 (Step 302). In the step device 41 of the present embodiment, for example, the minimum deployment distance D1 is set to about 20 cm. Further, the maximum deployment distance D2 is set to a value smaller than a maximum step deployment amount Lm that can extend the movable step 40 from the side edge portion 1s of the vehicle 1 to the outside in the vehicle width direction and in the width direction of the traveling road surface 70 (D2<Lm), in a state where a substantially horizontal posture of the movable step 40 is maintained, that is, the movable step 40 can be used by the occupant 35. That is, as described above, the step device 41 of the present embodiment operates in the deployment direction in excess of the maximum step deployment amount Lm, and thus, the movable step 40 functions as the slope plate 10 of the slope device 11 that forms the ramp R below the door opening 3 (refer to FIG. 7B). In the controller 50 of the present embodiment, the minimum deployment distance D1 and the maximum deployment distance D2 are held in a storage area (not illustrated).

When the deployment amount setting unit 75 of the present embodiment determines that the separation distance D from the sidewalk 71 is equal to or less than the maximum deployment distance D2 (D≤D2, Step 302: YES), the deployment amount setting unit 75 compares the detected height H of the sidewalk 71 with an interference determination value H0 set in advance with reference to a minimum ground clearance h0 of the movable step 40 (Step 303). When the deployment amount setting unit 75 determines that the height H of the sidewalk 71 is lower than the interference determination value H0 (H<H0, Step 303: YES), the deployment amount setting unit 75 sets the deployment amount L of the movable step 40 to a value obtained by adding a predetermined value α to the detected separation distance D between the side edge portion 1s of the vehicle 1 and the sidewalk 71 (L=D+α, Step 304). Then, when the deployment amount setting unit 75 of the present embodiment determines in Step 303 that the height H of the sidewalk 71 is equal to or more than the interference determination value H0 (H≥H0, Step 303: NO), the deployment amount setting unit 75 sets the deployment amount L of the movable step 40 to a value obtained by subtracting a predetermined value β from the separation distance D from the sidewalk 71 (L=D−β, Step 305).

That is, according to the separation distance D between the side edge portion 1s of the vehicle 1 and the sidewalk 71, the deployment amount setting unit 75 of the present embodiment sets the deployment amount L of the movable step 40 which is larger as the separation distance D increases. In the step device 41 of the present embodiment, the interference determination value H0 is set to a value smaller than the minimum ground clearance h0 of the movable step 40 having a substantially flat outer shape (H0<h0). That is, the deployment amount setting unit 75 of the present embodiment compares the interference determination value H0 with the height H of the sidewalk 71 to determine whether or not the movable step 40 extending in the width direction of the traveling road surface 70 interferes with the sidewalk 71. In the controller 50 of the present embodiment, for example, the predetermined values α and β used for calculating the deployment amount L are set to about several cm based on the separation distance D between the side edge portion 1s of the vehicle 1 and the sidewalk 71. Each of the predetermined values α and β and the interference determination value H0 are also held in a storage area (not illustrated) of the controller 50. Accordingly, in the step device 41 of the present embodiment, the movable step 40 can be deployed to a position closer to the sidewalk 71 which is the getting on/off position P of the occupant 35 who uses the movable step 40 while avoiding the interference between the sidewalk 71 and the movable step 40.

When the deployment amount setting unit 75 of the present embodiment determines in Step 302 that the separation distance D from the sidewalk 71 is larger than the maximum deployment distance D2 (D>D2, Step 302: NO), the deployment amount setting unit 75 sets the deployment amount L of the movable step 40 to a predetermined basic deployment amount L0 (L=L0, Step 306). In the step device 41 of the present embodiment, for example, the basic deployment amount L0 is set to about 30 cm. The controller 50 of the present embodiment holds the basic deployment amount L0 in a storage area (not illustrated). In the controller 50 of the present embodiment, even if the sidewalk detection unit 72 cannot detect the sidewalk 71, it is considered that the separation distance D from the sidewalk 71 is larger than the maximum deployment distance D2. Accordingly, in the step device 41 of the present embodiment, even when the sidewalk 71 is not detected at a position closer than the maximum deployment distance D2, that is, within a range in which the deployment amount L of the movable step 40 can be increased according to the separation distance D from the side edge portion 1s of the vehicle 1, the occupant 35 can get on or off the traveling road surface 70 by using the movable step 40.

When the deployment amount setting unit 75 of the present embodiment determines in Step 301 that the separation distance D from the sidewalk 71 is smaller than the minimum deployment distance D1 (D<D1, Step 301: NO), the deployment amount setting unit sets the deployment amount L of the movable step 40 to "0" so that the movable step 40 is not deployed (L=0, Step 306). Accordingly, in the step device 41 of the present embodiment, the movable step 40 deployed below the door opening 3 does not interfere with the occupant 35 getting on and off the vehicle 1 with the sidewalk 71 as the getting on/off position P.

Next, operations of the present embodiment will be described.

In the step device 41 of the present embodiment, according to the separation distance D between the side edge portion 1s of the vehicle 1 provided with the storage box 12 and the sidewalk 71, the larger deployment amount L of the movable step 40 is set as the separation distance D increases. Therefore, regardless of the positional relationship between the vehicle 1 and the sidewalk 71, the movable step 40 is deployed to a position close to the sidewalk 71, which is the getting on/off position P of the occupant 35 who uses the movable step 40. Accordingly, ease of getting on or off the vehicle 1 is improved.

Next, effects of the present embodiment will be described.

(1) The step device 41 includes the movable step 40 provided in the door opening 3 of the vehicle 1 and the actuator 25 that drives the movable step 40 so that the movable step 40 operates in the deployment and storage directions. The controller 50 that constitutes a drive controller by controlling the operation of the actuator 25 includes the sidewalk detection unit 72 that detects the sidewalk 71 provided in parallel with the traveling road surface 70 of the vehicle 1. The controller 50 includes the separation distance detecting unit 73 that detects the separation distance D between the side edge portion 1s of the vehicle 1 in which the movable step 40 is stored and the sidewalk 71, and the deployment amount setting unit 75 that sets the deployment amount L of the movable step 40 extending in the width direction of the traveling road surface 70 from the side edge portion 1s of the vehicle 1, based on the separation distance D. The deployment amount setting unit 75 sets the deployment amount L of the movable step 40 to be larger as the separation distance D between the side edge portion 1s of the vehicle 1 and the sidewalk 71 increases.

According to the configuration, regardless of the positional relationship between the vehicle 1 and the sidewalk 71, the movable step 40 can be deployed to a position closer to the sidewalk 71, which is the getting on/off position P of the occupant 35 who gets on or off the vehicle 1 through the door opening 3. Therefore, the ease of getting on or off the vehicle 1 can be improved.

(2) The controller 50 includes the height detection unit 74 that detects the height H of the sidewalk 71 with respect to the traveling road surface 70 of the vehicle 1. The deployment amount setting unit 75 compares the detected height H of the sidewalk 71 with the interference determination value H0 set in advance based on the minimum ground clearance h0 of the movable step 40. Then, when the height H of the sidewalk 71 is lower than the interference determination value H0, the deployment amount setting unit 75 sets the deployment amount L of the movable step 40 larger than the separation distance D between the side edge portion 1s of the vehicle 1 and the sidewalk 71, and when the height H of the sidewalk 71 is equal to or more than the interference determination value H0, the deployment amount setting unit 75 sets the deployment amount L of the movable step 40 smaller than the separation distance.

According to the configuration, the movable step 40 can be deployed to a position closer to the sidewalk 71 which is the getting on/off position P of the occupant 35 who uses the movable step 40 while avoiding the interference between the sidewalk 71 and the movable step 40.

(3) When the sidewalk 71 is not detected at a position closer than the predetermined maximum deployment distance D2, the deployment amount setting unit 75 sets the deployment amount L of the movable step 40 to a predetermined basic deployment amount L0.

According to the configuration, even when the sidewalk 71 is not detected at a position closer than the maximum deployment distance D2, that is, within a range in which the deployment amount L of the movable step 40 can be increased according to the separation distance D from the side edge portion 1s of the vehicle 1, the occupant 35 can get on or off the traveling road surface 70 by using the movable step 40. Accordingly, the ease of getting on or off can be improved. In particular, in a vehicle model having the door opening 3 at a high position, a more remarkable effect can be obtained.

(4) The deployment amount setting unit 75 does not deploy the movable step 40 when the separation distance D from the side edge portion 1s of the vehicle 1 is smaller than the predetermined minimum deployment distance D1.

According to the configuration, the movable step 40 deployed below the door opening 3 does not interfere with the occupant 35 getting on and off the vehicle 1 with the sidewalk 71 as the getting on/off position P. Accordingly, the ease of getting on or off can be improved.

(5) The controller 50 completes the deployment operation of the movable step 40 before the opening operation of the slide doors 4f and 4r provided in the door opening 3 starts. Accordingly, high safety can be ensured. In addition, a texture can be improved.

(6) The controller 50 starts the storage operation of the movable step 40 after the closing operations of the slide doors 4f and 4r are completed. Therefore, high safety can be ensured. In addition, the texture can be improved.

(7) The movable step 40 operates in the deployment direction in excess of the maximum step deployment amount Lm at which the occupant 35 can use the movable step 40, and thus, functions as the slope plate 10 that forms the ramp R below the door opening 3. As a result, for example, even when the occupant 35 is a user of a wheelchair, a carrier with wheels, a bicycle, or the like, the convenience can be improved.

The embodiment can be modified and implemented as follows. The embodiment and the following modification examples can be implemented in combination with each other within a technically consistent range.

In the embodiment, based on the operation input to the operation input unit 51, it is possible to select the slope mode in which the slope plate 10 deployed in a manner extending to the outside in the vehicle width direction from the side edge portion 1s of the vehicle 1 forms the ramp R and the step mode in which the slope plate 10 is used for the movable step 40. However, this disclosure is not limited to this. For example, the controller 50 determines necessity of the ramp R, such as the occupant 35 being a wheelchair user, by analyzing the captured image Vd of the camera 55 or the like. Accordingly, the slope mode and the step mode may be automatically selected.

In the embodiment, the slope plate 10 is embodied in the vehicle 1 including the slope device 11 that can be used as the movable step 40 of the step device 41. However, this disclosure is not limited to this, and if a configuration is such that the deployment amount L of the movable step 40 can be arbitrarily set, the slope device 11 may be applied to a vehicle including the step device 41 having no function as the slope device 11.

In the embodiment, by adding the predetermined value α to or subtracting the predetermined value β from the detected separation distance D between the side edge portion 1s of the vehicle 1 and the sidewalk 71, the deployment amount L of the movable step 40 is set to be larger as the separation distance D increases. However, this disclosure is not limited to this, and a calculation method of the deployment amount L according to the separation distance D may be arbitrarily changed, for example, by multiplying the detected separation distance D by a predetermined coefficient. Further, a configuration may be adopted in which a map or table in which the separation distance D and the deployment amount L are defined is held in advance. Then, the separation distance D and the deployment amount L of the movable step 40 do not necessarily have to be in a proportional relationship.

Figure 14:
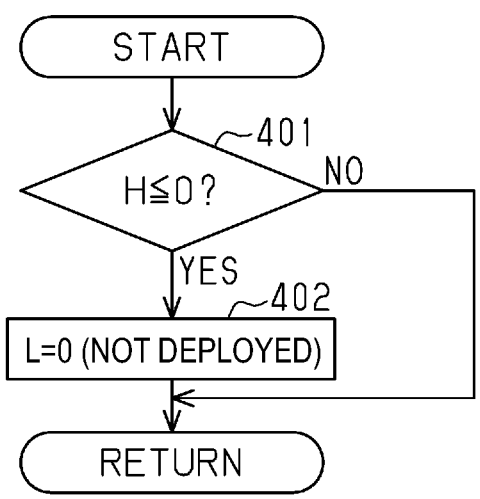
FIG. 14 is a flowchart illustrating another processing procedure for setting the deployment amount of the movable step.

As illustrated in the flowchart of FIG. 14, it is determined whether or not the detected height H of the sidewalk 71 is equal to or less than the height (H=0) of the traveling road surface 70 of the vehicle 1 (Step 401). When the height H of the sidewalk 71 is equal to or less than the height of the traveling road surface 70 (H≤0, Step 401: YES), the movable step 40 may not be deployed (L=0, Step 402). Accordingly, the movable step 40 deployed below the door opening 3 can be prevented from interfering with the occupant 35 who gets on or off the vehicle 1 with the traveling road surface 70 as the getting on/off position P.

Next, technical ideas that can be grasped from the embodiment and modification examples will be described.

(A) The vehicle step device wherein the drive controller starts the storage operation of the movable step after the closing operation of the door provided in the door opening is completed. Therefore, high safety can be ensured. In addition, the texture can be improved.

(B) The vehicle step device wherein the height detection unit that detects the height of the sidewalk with respect to the traveling road surface is provided, and when the height of the sidewalk is equal to or less than the height of the traveling road surface, the deployment amount setting unit does not deploy the movable step. As a result, the movable step deployed below the door opening can be prevented from interfering with the occupant who gets on or off the vehicle with the traveling road surface as the getting on/off position P.

A vehicle step device according to an aspect of this disclosure includes: a movable step that is provided in a door opening of a vehicle; and a drive controller that drives the movable step so that the movable step operates in deployment and storage directions, in which the drive controller includes a sidewalk detection unit that detects a sidewalk provided in parallel with a traveling road surface of the vehicle, a separation distance detecting unit that detects a separation distance between a side edge portion of the vehicle in which the movable step is stored and the sidewalk, and a deployment amount setting unit that sets a deployment amount of the movable step extending in a width direction of the traveling road surface from the side edge portion of the vehicle based on the separation distance, and the deployment amount setting unit sets a deployment amount of the movable step to be larger as the separation distance increases.

According to the configuration, regardless of a positional relationship between the vehicle and the sidewalk, the movable step can be deployed to a position closer to the sidewalk, which is a getting on/off position of an occupant who gets on or off the vehicle through the door opening. Accordingly, ease of getting on or off the vehicle can be improved.

The vehicle step device according to the aspect may include a height detection unit that detects a height of the sidewalk with respect to the traveling road surface, in which when the height of the sidewalk is lower than an interference determination value set in advance based on a minimum ground clearance of the movable step, the deployment amount setting unit may set the deployment amount of the movable step larger than the separation distance, and when the height of the sidewalk is equal to or more than the interference determination value, the deployment amount setting unit may set the deployment amount of the movable step smaller than the separation distance.

According to the configuration, the movable step can be deployed to a position closer to the sidewalk which is the getting on/off position of the occupant who uses the movable step while avoiding an interference between the sidewalk and the movable step.

In the vehicle step device according to the aspect, when the sidewalk is not detected at a position closer than a predetermined maximum deployment distance, the deployment amount setting unit may set the deployment amount of the movable step to a predetermined basic deployment amount.

According to the configuration, even when the sidewalk is not detected at a position closer than the maximum deployment distance, that is, within a range in which the deployment amount of the movable step can be increased according to the separation distance from the side edge portion of the vehicle, the occupant can get on or off the traveling road surface by using the movable step. As a result, the ease of getting on or off can be improved.

In the vehicle step device according to the aspect, when the separation distance is smaller than a predetermined minimum deployment distance, the deployment amount setting unit may not deploy the movable step.

According to the configuration, the movable step deployed below the door opening does not interfere with the occupant getting on and off the vehicle with the sidewalk as the getting on/off position. Accordingly, the ease of getting on or off can be improved.

In the vehicle step device according to the aspect, the drive controller may complete a deployment operation of the movable step before an opening operation of a door provided in the door opening starts.

According to the configuration, high safety can be ensured. In addition, a texture can be improved.

In the vehicle step device according to the aspect, the movable step may operate in a deployment direction in excess of a maximum step deployment amount usable as the movable step to function as a slope plate that forms a ramp below the door opening.

According to the configuration, for example, even when the occupant is a user of a wheelchair, a carrier with wheels, a bicycle, or the like, convenience can be improved.

According to this disclosure, it is possible to improve the ease of getting on or off the vehicle.

The principles, preferred embodiment and mode of operation of this disclosure have been described in the foregoing specification. However, this disclosure which is intended to be protected is not to be construed as limited to the particular embodiments disclosed. Further, the embodiments described herein are to be regarded as illustrative rather than restrictive. Variations and changes may be made by others, and equivalents employed, without departing from the spirit of this disclosure. Accordingly, it is expressly intended that all such variations, changes and equivalents which fall within the spirit and scope of this disclosure as defined in the claims, be embraced thereby.

What is claimed is:

1. A vehicle step device comprising:
a movable step that is provided in a door opening of a vehicle; and
a drive controller that drives the movable step so that the movable step operates in deployment and storage directions, the drive controller including
a sidewalk detection unit that detects a sidewalk provided in parallel with a traveling road surface of the vehicle,
a separation distance detecting unit that detects a separation distance between a side edge portion of the vehicle in which the movable step is stored and the sidewalk, and
a deployment amount setting unit that sets a deployment amount of the movable step extending in a width direction of the traveling road surface from the side edge portion of the vehicle based on the separation distance; and
a height detection unit that detects a height difference between the sidewalk and the traveling road surface, wherein
the deployment amount setting unit sets a deployment amount of the movable step to be larger as the separation distance increases,
when the height difference of the sidewalk is lower than an interference determination value that is a value smaller than a minimum ground clearance of the movable step, the deployment amount setting unit sets the deployment amount of the movable step larger than the separation distance, and
when the height difference of the sidewalk is equal to or more than the interference determination value, the deployment amount setting unit sets the deployment amount of the movable step smaller than the separation distance.

2. The vehicle step device according to claim 1, wherein when the sidewalk is not detected at a position closer than a predetermined maximum deployment distance, the deployment amount setting unit sets the deployment amount of the movable step to a predetermined basic deployment amount.

3. The vehicle step device according to claim 1, wherein when the separation distance is smaller than a predetermined minimum deployment distance, the deployment amount setting unit does not deploy the movable step.

4. The vehicle step device according to claim 1, wherein the drive controller completes a deployment operation of the movable step before an opening operation of a door provided in the door opening starts.

5. The vehicle step device according to claim 1, wherein the movable step operates in a deployment direction in excess of a maximum step deployment amount useable as the movable step to function as a slope plate that forms a ramp below the door opening.

6. The vehicle step device according to claim 5, wherein the slope plate is configured to be stopped in a position to function as the movable step before the slope plate is completely extended out in a vehicle width direction.

* * * * *